US005946398A

United States Patent [19]

Rao

[11] Patent Number: 5,946,398

[45] **Date of Patent: *Aug. 31, 1999**

[54] STATE SYNCHRONIZED CIPHER TEXT SCRAMBLER

[75] Inventor: Sailesh Krishna Rao, Colts Neck, N.J.

[73] Assignee: Level One Communications, Inc., Sacramento, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/924,064

[22] Filed: Aug. 28, 1997

Related U.S. Application Data

[60] Provisional application No. 60/042,470, Mar. 25, 1997.

[51] Int. Cl.[6] .............................. H04L 9/00; H04L 9/28

[52] U.S. Cl. .............................. 380/33; 380/9; 380/28; 380/42; 380/49

[58] Field of Search .............................. 380/9, 28, 33, 380/42, 43, 44, 45, 46, 47, 48, 49, 50, 59

[56] References Cited

U.S. PATENT DOCUMENTS 3,054,857 9/1962 Weiss .............................. 380/33
3,059,054 10/1962 Reiter .............................. 380/33 X
3,784,743 1/1974 Schroeder .
3,967,066 6/1976 Mathes .............................. 380/33
4,304,962 12/1981 Fracassi et al. .
4,663,501 5/1987 Pospischil .
4,744,104 5/1988 Pospischil .
5,163,092 11/1992 McNesby et al. .
5,185,799 2/1993 McNesby et al. .
5,377,265 12/1994 Wettengel et al. .
5,448,640 9/1995 Kim et al. .

OTHER PUBLICATIONS

S. H. Taso, "Generation of delayed replicas of maximal length linear binary sequences," *Proc. IEE*, vol. 111, No. 11, pp. 1803–1806 (Nov. 1964).

*Primary Examiner*—Bernarr E. Gregory
*Attorney, Agent, or Firm*—Merchant & Gould P.C.

[57] ABSTRACT

A state synchronized cipher text scrambler is disclosed. The state synchronized cipher text scrambler enables multiple data streams to be scrambled in parallel in such a way that the data streams are uncorrelated with respect to each other and there is a large fixed delay relationship between the scrambler bits over the multiple streams. This enables a receiver to correctly identify the ordering of the multiple data streams with respect to each other automatically, correct for any polarity or wire-swap misconnections and align the received multiple data streams despite differential delays between the data streams.

26 Claims, 3 Drawing Sheets

360 Pair D Scrambler
376
374
300
372
364
366
368
D input data
370
340 Pair C Scrambler
386
362
354
350
343
344
346
384
352
348
C input data
342
320 Pair B Scrambler
336
332
330
306
304
321
322
334
308
B input data
Bit 17
Bit 22
302 Pair A Scrambler
380
312
326
328
303
A input data
390
310
382

100
Scrambler
120
122
124
126
128
130
132
Input Data
104
106
110
108
Transmit Data
150
Descrambler
Receive Data
Output Data Pair D Scrambler
D input data
Pair C Scrambler
C input data
Pair B Scrambler
B input data
Pair A Scrambler
A input data
Bit 17
Bit 22
300
302
303
304
306
308
310
312
320
321
322
326
328
330
332
334
336
340
342
343
344
346
348
350
352
354
360
362
364
366
368
370
372
374
376
380
382
384
386
390

STATE SYNCHRONIZED CIPHER TEXT SCRAMBLER

This application claims benefit of U.S. Provisional application Ser. No. 60/042,478, filed Mar. 25, 1997.

BACKGROUND OF THE INVENTION

1. Field of the Invention

This invention relates in general to a parallel cipher text scrambler, and more particularly to cipher text scrambler and method for scrambling multiple, parallel data streams so that the data streams are uncorrelated and have a fixed delay therebetween.

2. Description of Related Art

Communication information encryption is performed in digital data communications to provide security. Furthermore, communication applications require the sequence of data bits transmitted over a communication channel to be statistically random. In order to achieve the required degree of randomness, the data can be scrambled using a Maximal Length Pseudo Random Sequence. Maximal Length Pseudo Random Sequences are known to have the lowest possible auto-correlation, and are therefore the optimal choice for scrambling.

Two techniques have been generally used in the prior art to perform the scrambling operation: block scrambling and stream scrambling. Both techniques take advantage of the fact that when a first sequence of bits is exclusively OR'ed with a second sequence of bits and is then again exclusively OR'ed with the second sequence of bits identically aligned, the output is the first sequence just as it was before any exclusive OR operations were performed.

Block scrambling uses a framing pattern or other known means to provide the bits into some definable blocks of information. These bits are then exclusively OR'ed with a fixed pattern of bits synchronized to the boundaries of the block. Since a pattern of scrambling bits is fixed with respect to the block, the same pattern can be used at the receiver end to unscramble the bits. Any bit error occurring in the transmission channel between the transmitter and receiver will cause an error in that particular bit, but will not cause other bits to be in error, provided only that the receivers remain synchronized with the transmitters to the block boundaries. However, the longest framing pattern is not usually equal to the $2^{n-1}$ length of the pseudo random pattern desired, so that only part of the pattern is used repetitively, introducing undesirable correlations in the data.

Stream scrambling of the known prior art generally operates on a continuous stream of bits. In typical implementation, the bits at the transmitting end of a communication channel to be scrambled are passed through one input of a two input exclusive OR gate. The output of the gate is the output of the scrambler and also the input to an N-stage shift register. This shift register is tapped at the Nth stage and one or more other stages, and the outputs of these taps are exclusively OR'ed together. The result of this exclusive OR operation is applied to the other input of the exclusive OR gate that has the data to be scrambled, as the first input. The tap positions are chosen so that a Galois polynomial represented by the tap weight is irreducible, and if the input data were all zeros and the shift register started out at any state other than all zeros, a Maximal Length Pseudo Random Sequence would be produced.

As mentioned, pulse patterns can have an energy component which is particularly high at certain discrete frequencies. In order to avoid these pulse patterns, the digital signal to be transmitted must be scrambled at the transmitting side with a pseudo random sequence. The descrambling occurs at the receiving side with the pseudo random sequence which was employed at the transmitting side. The synchronization of the pseudo random generators employed at the transmitting receiving sides which is thereby necessary, can be avoided by employing freewheeling and, therefore, self synchronizing scrambler and descrambler arrangements. In order to achieve high bit rates, modulating signals having a high clock frequency are often scrambled in a plurality of parallel channels having a lower bit repetition frequency. However, the bit streams must be synchronized in order to reconstruct the original signal.

Thus it can be seen that there is a need for a cipher text scrambler which enables multiple data streams to be scrambled in parallel in such a way that the data streams are uncorrelated with respect to each other.

It can also be seen that there is a need for a cipher text scrambler that provides a large fixed delay relationship between the scrambler bits over the multiple streams.

It can also be seen that there is a need to provide a cipher text scrambler that can correctly identify the ordering of the multiple data streams with the respect to each other, correct for any polarity or wire swap misconnections and align the received multiple data streams despite differential delays between the data streams.

SUMMARY OF THE INVENTION

To overcome the limitations in the prior art described above, and to overcome other limitations that will become apparent upon reading and understanding the present specification, the present invention discloses a cipher text scrambler.

The present invention solves the above-described problems by providing a state synchronized cipher text scrambler which enables multiple data streams to be scrambled in parallel in such a way that the data streams are uncorrelated with respect to each other and which provides a large fixed delay relationship between the scrambler bits over multiple streams.

A system in accordance with the principles of the present invention includes a four parallel data scramblers for receiving input streams and converting them into cipher text outputs, wherein the first data scrambler includes a first shift register for generating a first keystream representing a generating polynomial, the second data scrambler generating a second keystream based on the first keystream using taps from the first shift register, the taps from the first shift register defining a second polynomial, the third data scrambler including a second shift register for generating a third keystream based on the second keystream, the second shift registers using the second polynomial and the fourth data scrambler including a third shift register for generating a fourth keystream based on the third keystream, the third shift registers using the second polynomial.

Other embodiments of a system in accordance with the principles of the invention may include alternative or optional additional aspects. One such aspect of the present invention is that the second, third and fourth keystreams track the first polynomial when the first input stream has a correct polarity.

Another aspect of the present invention is that the second, third and fourth keystreams do not track the first keystream when the first input stream has an incorrect polarity.

Another aspect of the present invention is that a fixed delay occurs between the cipher text outputs.

Another aspect of the present invention is that the fixed delay is dependent upon the second polynomial.

Another aspect of the present invention is that the first, second, third and fourth cipher text outputs are uncorrelated with respect to each other.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a state synchronized cipher text scrambler. The state synchronized cipher text scrambler according to the present invention enables multiple data streams to be scrambled in parallel in such a way that the data streams are uncorrelated with respect to each other and there is a large fixed delay relationship between the scrambler bits over the multiple streams. This enables a receiver to correctly identify the ordering of the multiple data streams with respect to each other automatically, correct for any polarity or wire-swap misconnections and align the received multiple data streams despite differential delays between the data streams.

Figure 1:
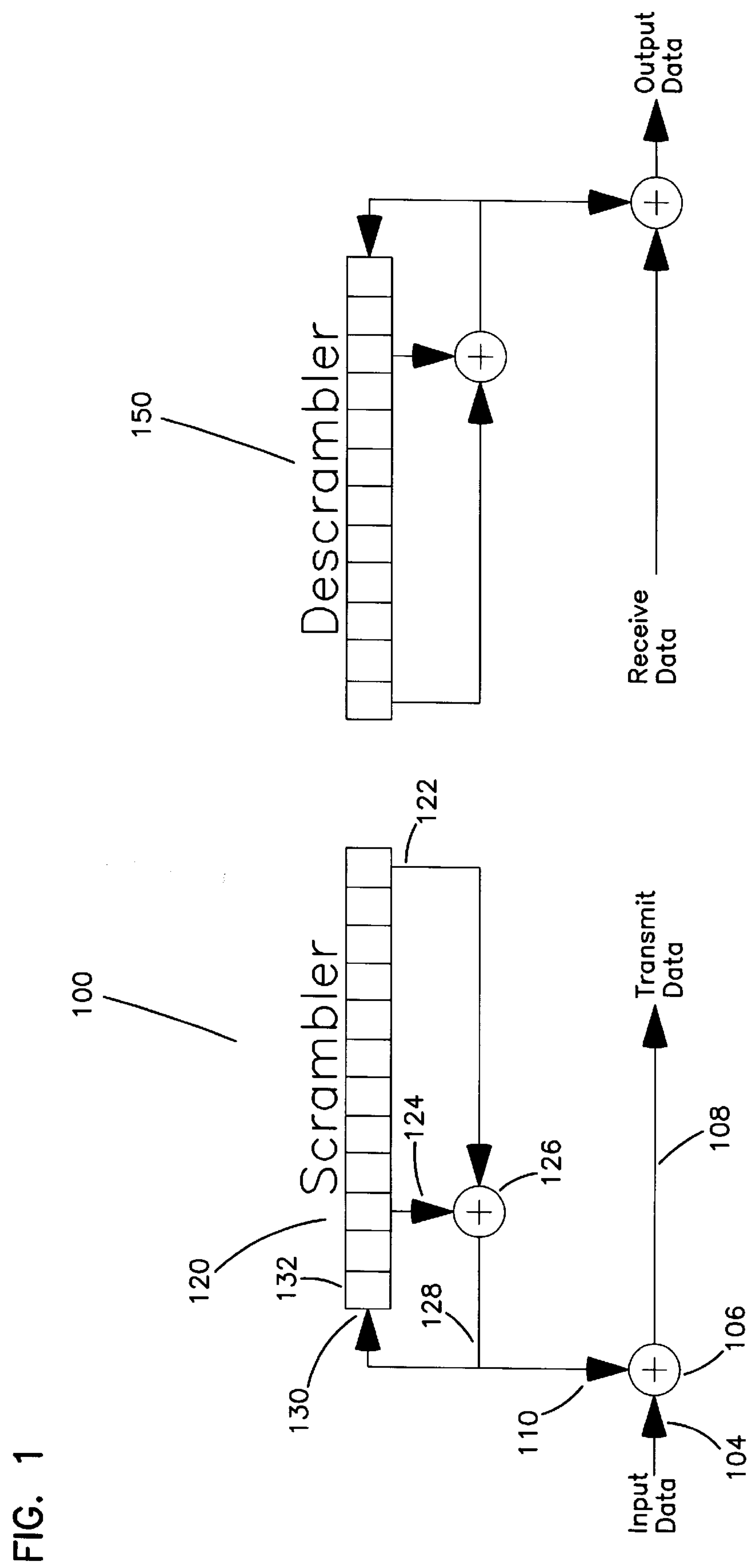
FIG. 1 illustrates a transmit and receive side scrambler.

FIG. 1 illustrates a transmit 100 and receive 150 side scrambler. Transmit scrambler 100 is used to randomize input data streams 102 so that the line signals so constructed are free of signal energy concentrated at specific frequencies and provides signal transitions adequate in number to assure reliable recovery of the data.

Cipher Text scramblers are typically constructed using Maximal Length Pseudo Random Sequence generators employing irreducible polynomials in the binary Galois field. In a Galois field, addition, subtraction, multiplication and division by non-zero elements are all well-defined. There is an additive identity, 0, and a multiplicative identity, 1. Every non-zero number has a unique inverse and the commutative, associative, and distributive laws are true. Further, in Galois fields, all of the number theory works while numbers are kept at a finite size and division does not cause rounding errors.

In a cipher text scrambler 100, input bits 102 are passed through one input 104 of a two input exclusive OR gate 106. The output 108 of the gate 106 is the output of the scrambler 100. The second input 110 of the exclusive OR gate 106 is produced by an N-stage shift register 120. This shift register is tapped at the Nth stage 122 and one or more other stages 124, and the outputs of these taps are exclusively OR'ed together 126. The result 128 of this exclusive Or operation is applied to the input 130 of the N-stage shift register 120 and the second input 110 of the exclusive OR gate 106 that has the data to be scrambled, as the first input 104. The result 128 at the second input 110 acts as the keystream for creating the cipher text output 108. The tap positions 122, 124 are chosen so that a Galois polynomial represented by the tap weight is irreducible. The same arrangement can be used at the receiver end 150 to unscramble the scrambled receive bits 152.

The transmitter 100 and the receiver 150 achieve synchronization of the scrambler states during start-up initialization by, e.g., simply transmitting the zeroth bit 132 of the scrambler for a fixed period of time. Once such synchronization is achieved, the sender 100 and the receiver 150 can scramble and unscramble the data stream and thus achieve reliable data transmission.

As suggested above, cipher text scramblers are typically constructed using primitive polynomial in the binary Galois field. For example, $1+x^{18}+x^{23}$ is one such polynomial of degree 23, that is used in voiceband modems. Such polynomials are known to exist for every degree.

Figure 2:
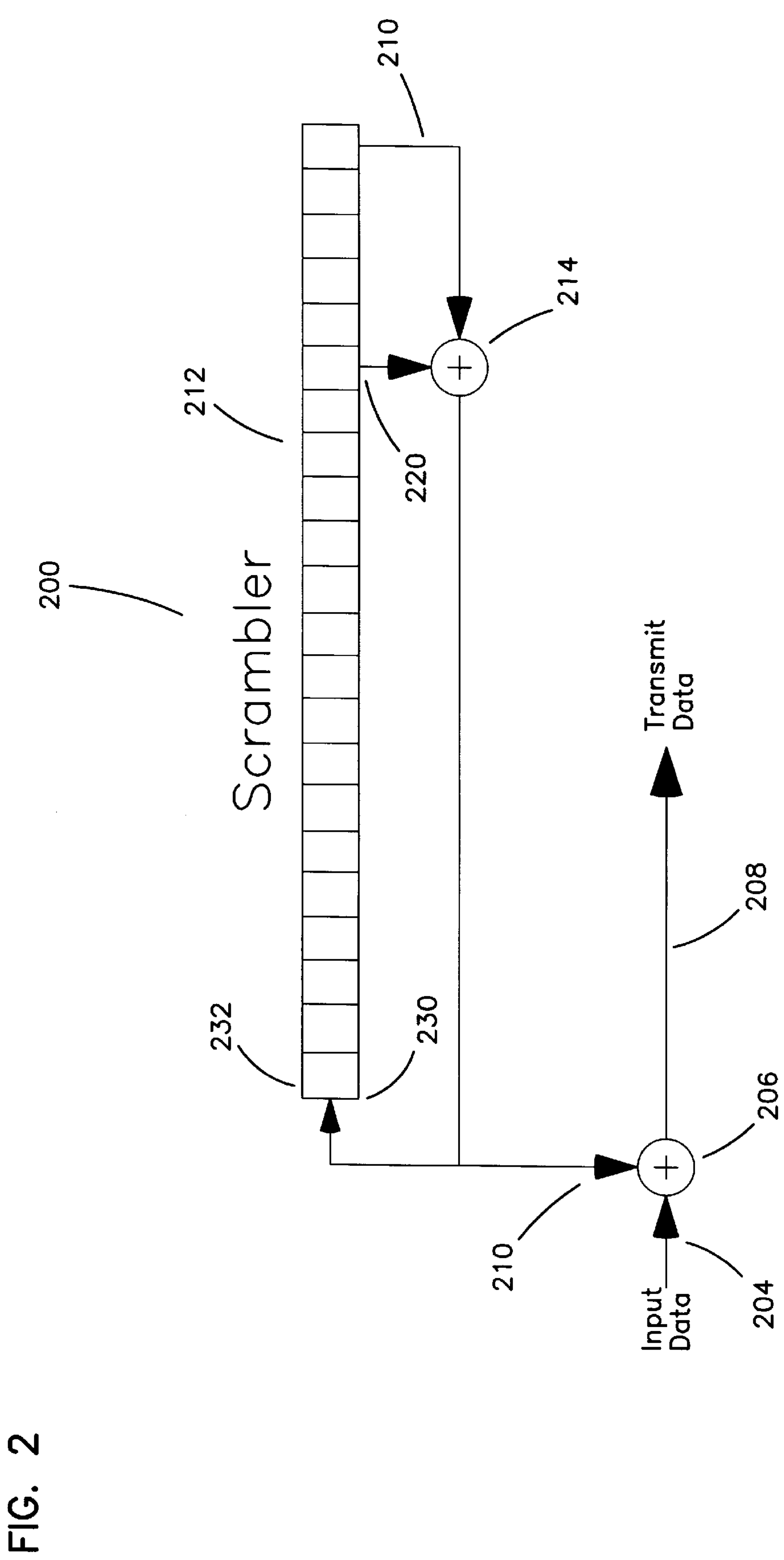
FIG. 2 illustrates a scrambler using a $1+x^{18}+x^{23}$ polynomial.

FIG. 2 illustrates a scrambler 200 using the $1+x^{18}+x^{23}$ polynomial. To construct the scrambler 200, the 22nd bit 210 of a shift register 212 is exclusively OR'ed 214 with the 17th bit 220 in order to derive a new input 230 for the register 212. If the register 212 is initialized with any non-zero bit sequence, then the register states pass through every possible combination of values (other than the all-zero state) before returning to the initialized value.

Any polynomial p(x), of lesser degree than the generating polynomial, g(x), of a scrambler 200 can be expressed in modulo arithmetic as:

$$p(x)=x^N \text{modulo } g(x)$$

where N is a fixed number. To determine N, one can either use Zech logarithms or use the procedure as described herein below.

First, the scrambler register 212 is initialized with zeros except for the first register 232 which is initialized to 1. Now, the scrambler is advanced while the count of the advancement is monitored until the register states correspond to p(x). The number of advances is N.

Typically, for simple functions, e.g., $x+x^2$, N will be very large for a reasonably high degree polynomial g(x). This fact can be used to construct the state synchronized cipher text scrambler for a suitable choice of p(x) and g(x).

Figure 3:
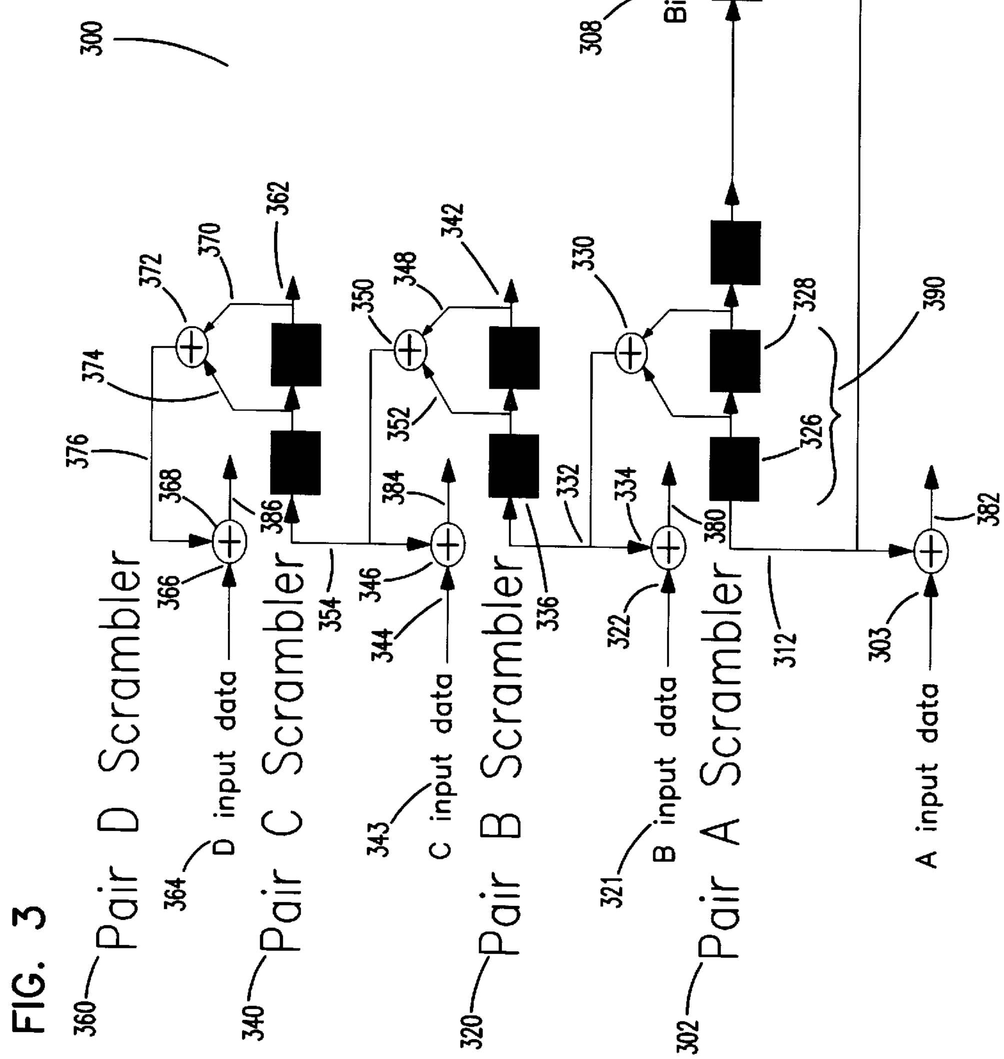
FIG. 3 illustrates a 4-pair state synchronized cipher text scrambler according to the present invention.

FIG. 3 illustrates a 4-pair state synchronized cipher text scrambler 300 constructed using the polynomials $g(x)=1+{}^{18}+x^{23}$ and $p(x)=x+x^2$. However, those skilled in the art will recognize that the invention is not meant to be limited to these two polynomials. Other polynomials can be used in accordance with the teaching of the invention.

The scrambler for pair A 302 uses the polynomial $g(x)=1+{}^{18}+x^{23}$ as illustrated in FIG. 2. Pair A scrambler 302 receives first input data 303. The 22nd bit 304 of a first shift register 306 is exclusively OR'ed 310 with the 17th bit 308 in order to provide a new input 312 to the register 306. Again, if the register 306 is initialized with any non-zero bit sequence, then the register 306 states pass through every possible combination of values (other than the all-zero state) before returning to the initialized value.

Scramblers for Pairs B 320, C 340, and D 360 use the polynomial $p(x)=x+x^2$. Pair B Scrambler 320 receives input data 321 at a first input 322 of an exclusive OR gate 324. The first two registers 326, 328 of the Pair A Scrambler's 302 shift register 306 act as the register for the Pair B Scrambler. The second bit 328 of the shift register 306 for Pair A Scrambler 302 is exclusively OR'ed 330 with the first bit 326 to produce a second input 332 to the exclusive OR gate 334. The output of the second keystream exclusive OR gate 330 is also the new zeroth bit 336 of the register 342 for the Pair C Scrambler 340.

Pair C Scrambler 340 receives input data 343 at a first input 344 of an input exclusive OR gate 346. The Pair C register 342 provides the second bit 348 of the shift register 342 which is exclusively OR'ed 350 with the first bit 352. The output 354 of the third keystream exclusive OR gate 350 provides a second input 354 to the Pair C scrambler's 340 input exclusive OR gate 346. The output of the register exclusive OR gate 350 is also the new input to the register 362 for the Pair D Scrambler 360.

Pair D Scrambler 360 receives input data 364 at a first input 336 of an input exclusive OR gate 368. The Pair D register 362 provides the second bit 370 of the shift register 362 which is exclusively OR'ed 372 with the first bit 374. The output of the register exclusive OR gate 376 provides a second input 378 to the Pair D scrambler's 360 input exclusive OR gate 368.

The 4-pair state synchronized cipher text scrambler 300 sequence obeys or tracks the generating polynomial of the first register 306, g(x), on every pair. If the scrambler sequence is inverted, i.e., if the receiver has an incorrect polarity on the wires, the sequence will not obey the generating polynomial, g(x), at all. This allows the receiver to correct for such errors automatically.

The 4-pair state synchronized cipher text scrambler 300 also provides a fixed delay between the pairs. The fixed delay depends upon the polynomial of the second 390, third 342 and fourth 362 registers, p(x). The scrambler output sequence 380 on pair B 320 is delayed with respect the output sequence 382 of pair A 302 by a large fixed amount. The output sequence 384 on pair C 340 is delayed with respect to the output sequence 380 of pair B 320 by the same large fixed amount. The output sequence 386 of pair D 360 is delayed with respect to the output sequence of pair C 360 by this amount as well.

Further, the scrambler sequence on any pair is essentially uncorrelated with respect to the sequence on any other pair. Once polarity is checked and corrected, the receiver can hypothesize the ordering and differential delay, if any, check that the bit-wise relationship between the sequences obtained on each pair holds, and correct for incorrect wire-pair connections.

In summary, the state synchronized cipher-text scrambler allows multiple data streams to be scrambled and synchronized in such a manner that the receiver at the other end can correct for incorrectly swapped connections, align the data streams in the presence of differential delays between the data streams and perform automatic polarity correction on each of the received streams. The state synchronized cipher-text scrambler does so without introducing error multiplication, unlike conventional self-synchronizing scramblers.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A state synchronized cipher text scrambler, comprising:

a first data scrambler for receiving a first input stream and converting the first input stream to a first cipher text output, the first data scrambler further comprising a first pseudo random sequence generator employing a first polynomial for generating a first keystream for converting the first input stream to the first cipher text output; and a second data scrambler, operatively coupled to the first data scrambler, for receiving a second input stream and converting the second input stream to a second cipher text output, the second data scrambler receiving a second keystream from the first pseudo random sequence generator, the second keystream being derived from a second polynomial of lesser degree than the first polynomial and used to convert the second input stream to the second cipher text output, wherein the first and second cipher text outputs are uncorrelated.

2. The state synchronized cipher text scrambler of claim 1 further comprising at least a third data scrambler operatively coupled the second data scrambler, the third data scrambler receiving at least a third input data stream and further comprising a third pseudo random sequence generator for generating a third keystream based on the second keystream for converting the third input stream to the third cipher text output.

3. The state synchronized cipher text scrambler of claim 2 further comprising at least a fourth data scrambler operatively coupled the third data scrambler, for receiving at least a fourth input data stream, the fourth data scrambler comprising a fourth pseudo random sequence generator for generating a fourth keystream based on the third keystream for converting the fourth input stream to the fourth cipher text output.

4. The state synchronized cipher text scrambler of claim 3 wherein the first pseudo random generator uses a first primitive polynomial to generate the first keystream and the second, third and fourth keystreams are derived using a second primitive polynomial.

5. The state synchronized cipher text scrambler of claim 4 further comprising a fixed delay between the cipher text outputs.

6. The state synchronized cipher text scrambler of claim 5 wherein the fixed delay is dependent upon the second primitive polynomial.

7. The state synchronized cipher text scrambler of claim 3 wherein the second, third and fourth keystreams track the first keystream when the first input stream has a correct polarity.

8. The state synchronized cipher text scrambler of claim 3 wherein the second, third and fourth keystreams do not track the first keystream when the first input stream has an incorrect polarity.

9. The state synchronized cipher text scrambler of claim 8 wherein the coupling of the first, second, third and fourth scramblers allow a receiver to automatically correct for errors.

10. The state synchronized cipher text scrambler of claim 3 wherein the first, second, third and fourth cipher text outputs are uncorrelated with respect to each other.

11. The state synchronized cipher text scrambler of claim 1 wherein the first and second cipher text outputs are uncorrelated.

12. A state synchronized cipher text scrambler, comprising N parallel data scramblers for receiving N parallel input streams and converting the N parallel input streams to N parallel cipher text outputs, each of the N parallel data scramblers comprising a pseudo random sequence generator employing a polynomial, an Nth parallel data scrambler further comprising an Nth pseudo random sequence generator for providing an Nth keystream for converting an input stream to a cipher text output, and wherein the Nth keystream is based upon a (N−1)th keystream, and wherein the N parallel cipher text outputs are uncorrelated.

13. The state synchronized cipher text scrambler of claim 12 wherein a first keystream is based on a first polynomial and the other N−1 keystreams are based on a second polynomial.

14. The state synchronized cipher text scrambler of claim 13 wherein the other N−1 keystreams track the first keystream when a first input stream has a correct polarity.

15. The state synchronized cipher text scrambler of claim 13 wherein the other N−1 keystreams do not track the first keystream when a first input stream has an incorrect polarity.

16. The state synchronized cipher text scrambler of claim 13 wherein the fixed delay is dependent upon the second primitive polynomial.

17. The state synchronized cipher text scrambler of claim 12 wherein the N pseudo random sequence generators comprise N feedback shift registers.

18. The state synchronized cipher text scrambler of claim 17 wherein a first feedback shift register generates a keystream using a $1+x^{18}+x^{23}$ polynomial and N−1 feedback shift generators generate keystreams using a $x+x^2$ polynomial.

19. The state synchronized cipher text scrambler of claim 12 further comprising a fixed delay between the cipher text outputs.

20. The state synchronized cipher text scrambler of claim 12 wherein the N parallel cipher text outputs are uncorrelated with respect to each other.

21. A state synchronized cipher text scrambler, comprising:

a first data scrambler for receiving a first input stream and converting the first input stream to a first cipher text output, the first data scrambler comprising a first shift register for generating a first keystream representing a generating polynomial;

a second data scrambler for receiving a second input stream and converting the second input stream to a second cipher text output, the second data scrambler generating a second keystream based on the first keystream using taps from the first shift register, the taps from the first shift register defining a second polynomial;

a third data scrambler for receiving a third input stream and converting the third input stream to a third cipher text output, the third data scrambler comprising a second shift register for generating a third keystream based on the second keystream, the second shift registers using the second polynomial; and a fourth data scrambler for receiving a fourth input stream and converting the fourth input stream to a fourth cipher text output, the fourth data scrambler comprising a third shift register for generating a fourth keystream based on the third keystream, the third shift registers using the second polynomial.

22. The state synchronized cipher text scrambler of claim 21 wherein the second, third and fourth keystreams track the first polynomial when the first input stream has a correct polarity.

23. The state synchronized cipher text scrambler of claim 21 wherein the second, third and fourth keystreams do not track the first keystream when the first input stream has an incorrect polarity.

24. The state synchronized cipher text scrambler of claim 21 further comprising a fixed delay between the cipher text outputs.

25. The state synchronized cipher text scrambler of claim 24 wherein the fixed delay is dependent upon the second polynomial.

26. The state synchronized cipher text scrambler of claim 21 wherein the first, second, third and fourth cipher text outputs are uncorrelated with respect to each other.

* * * * *

UNITED STATES PATENT AND TRADEMARK OFFICE
CERTIFICATE OF CORRECTION

PATENT NO. : 5,946,398

DATED : AUGUST 31, 1999

INVENTOR(S) : RAO

It is certified that error appears in the above-identified patent and that said Letters Patent is hereby corrected as shown below:

Col. 1, line 5: "60/042,478" should read --60/042,470--

Signed and Sealed this

Twentieth Day of March, 2001

*Attest:*

NICHOLAS P. GODICI

*Attesting Officer* *Acting Director of the United States Patent and Trademark Office*